United States Patent [19]

Berg

[11] 4,122,927

[45] Oct. 31, 1978

[54] DISCONNECT LINKAGE FOR FORCE TRANSMISSION SYSTEM

[75] Inventor: Alan Berg, Horsham, Pa.

[73] Assignee: The United States of America as represented by the Secretary of the Navy, Washington, D.C.

[21] Appl. No.: 799,049

[22] Filed: May 13, 1977

[51] Int. Cl.² ............ F16D 25/08; F16D 25/10; G05G 11/00

[52] U.S. Cl. .......................... 192/48.8; 74/479; 192/30 W; 192/85 CA; 192/87.1; 192/96; 244/84

[58] Field of Search ............... 192/48.8, 85 CA, 87.1, 192/96, 30 W; 74/479; 180/77 C; 244/84

[56] References Cited

U.S. PATENT DOCUMENTS

| | | | |
|---|---|---|---|
| 1,277,590 | 9/1918 | Hinkler | 244/84 |
| 1,817,204 | 8/1931 | Petersen | 244/84 |
| 2,548,268 | 4/1951 | Metsger | 192/85 CA |
| 2,703,988 | 3/1955 | Stevens | 74/479 X |
| 3,526,152 | 9/1970 | Farrington et al. | 192/48.9 X |
| 3,582,929 | 6/1971 | Dollase | 192/30 W X |
| 3,651,583 | 3/1972 | Clark et al. | 244/84 X |

*Primary Examiner*—Allan D. Herrmann
*Attorney, Agent, or Firm*—R. S. Sciascia; Henry Hansen; Stanton D. Weinstein

[57] ABSTRACT

A device for disconnectably linking a plurality of force producing or receiving means such as a mechanical control system. The device comprises a coaxial array of a plurality of positive locking clutches, each clutch including two clutch halves. A single shaft passing through all clutch halves disengages and engages all clutches together as a motor connected thereto is actuated. The shaft is fail-safe spring loaded to the disengaged position, so that the spring will disengage all clutches if there is a power or motor failure.

13 Claims, 5 Drawing Figures

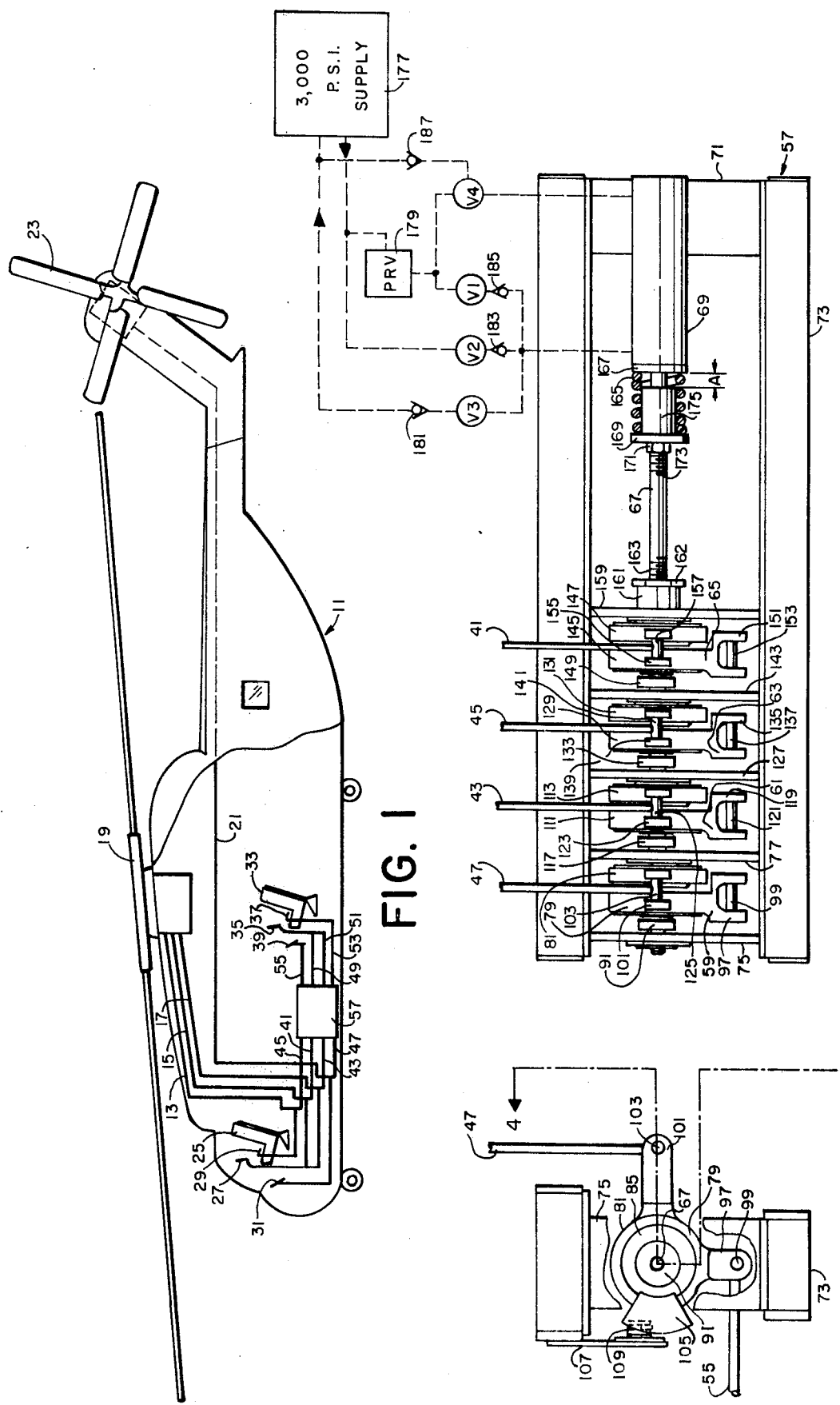

DISCONNECT LINKAGE FOR FORCE TRANSMISSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to control systems and more particularly to disconnectable multiple linkage systems therefor.

In dual controlled aircraft such as training aircraft, it is often necessary in emergency situations to be able to disconnect one set of controls from the other, so that only one pilot is operating the aircraft. This requires a device capable of reliably connecting the two sets of controls and rapidly disconnecting them in the event that disengagement of one set of controls is needed. Previous disconnectable linking devices have accomplished disconnectable linking of the two sets of controls, but have required too much time for disengagement. Also, such devices are not equipped with fail-safe features or components to prevent disaster in situations wherein the power supply for actuating the linkage fails. In addition, since aircraft typically include more than one control system (pitch, roll and yaw), it has been necessary to provide a separately controlled and operated linkage for each flight control, resulting in further delay in disengagement. Furthermore, when such aircraft is used for pilot training purposes, it is necessary that the instructor be able to rapidly disengage the student's controls, particularly when the student "freezes" or holds tightly onto his control stick placing a high load on the linkage.

SUMMARY OF THE INVENTION

Accordingly, it is a general purpose of the present invention to provide a disconnect linkage capable of reliable force transmission between, and rapid, remote controlled disengagement of, a plurality of force producing or receiving means, irrespective of loading on the system.

Other objects of the present invention are to provide a disconnect linkage which provides instantaneous disengagement, fail-safe features to provide for power failure, and which accomplishes interconnection of the individual disconnect links for a multiple-control system.

Further objects of the present invention are to provide a disconnect linkage which is capable of rapidly disengaging a secondary flight control position from aircraft controls to thereby allow the primary flight control position to exercise exclusive control of the aircraft, provides the primary pilot with instantaneous disengagement capability in an emergency, will disengage if there is a system power failure, provides a positive disconnect between primary and secondary aircraft controls, and improves the safety of dual-controlled aircraft.

Briefly, these and other objects of the invention are accomplished by a disconnect linkage comprising a coaxial array of positive-locking clutches ganged to all be engaged and disengaged by a single shaft. Each clutch includes two clutch halves, one of which is slidably engaged to the shaft and the other of which is rotatably engaged to the linkage casing. Each clutch half is formed to be connected to separate force-producing or force-receiving means as part of a force transmission system. The shaft is coupled to and is longitudinally driven by a hydraulic cylinder or other motor. Longitudinal movement of the shaft by the motor in one direction causes the engaging surfaces of each pair of clutch halves to be brought together for engagement. Movement of the shaft in the opposite direction causes each pair of clutch halves to be separated, thus effecting disengagement simultaneously. Once the engaging surfaces of each pair of clutch halves have been brought together, manipulation of the clutch halves causes the proper alignment for positive engagement, after which the pressure applied by the motor through the shaft to the clutch halves is increased to hold each clutch positively locked. In the event of power failure to the motor, a spring fixed to the shaft and to the motor causes the shaft to move longitudinally in such a direction as to cause separation of each pair of clutch halves and thus disengagement of the entire linkage.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a partial sectional view of a helicopter having a disconnect linkage according to the present invention, and primary and secondary flight controls disengagably connected thereby, installed therein;

FIG. 2 is a plan view of a preferred embodiment of a disconnect linkage according to the present invention;

FIG. 3 is an end view of the disconnect linkage of FIG. 2 with a portion of the casing thereof removed;

DESCRIPTION OF THE PREFERRED EMBODIMENT

Figure 5:
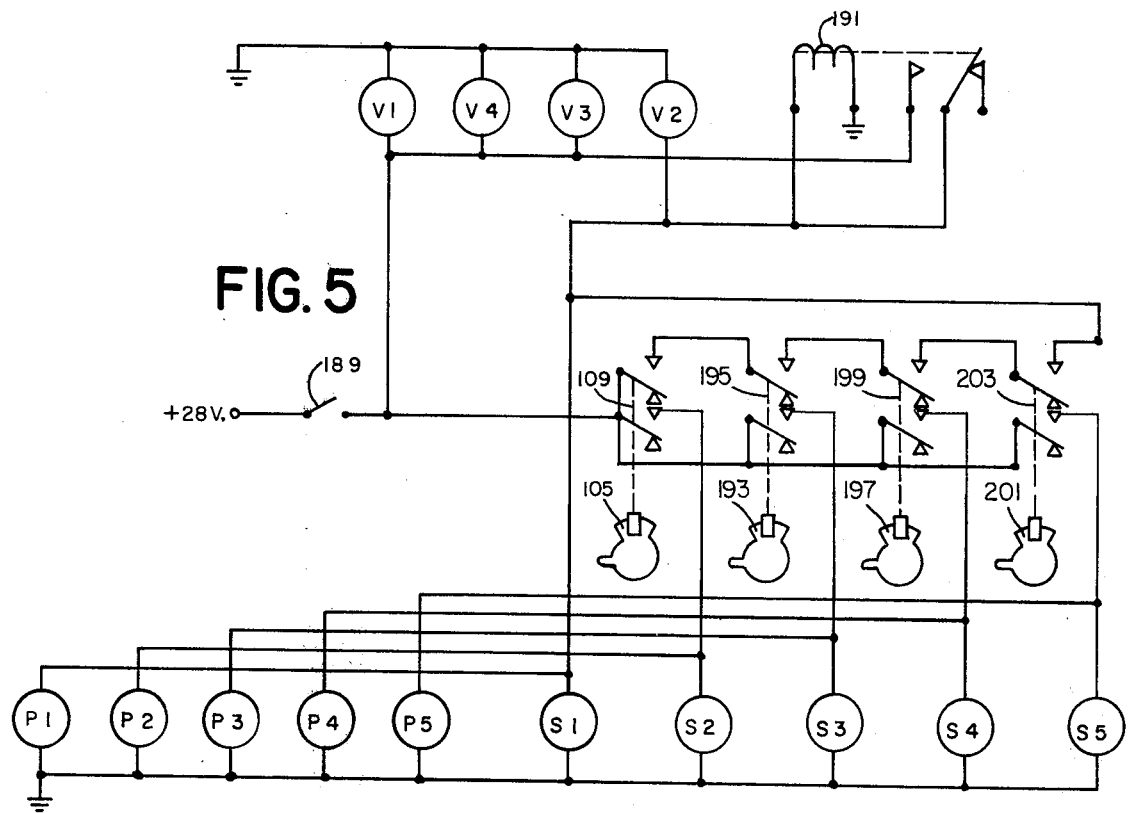
FIG. 5 is a schematic diagram of a preferred embodiment of the electrical connections for the disconnect linkage of FIG. 2.

Referring now to the drawings, wherein like reference characters designate like or corresponding parts throughout the several views, there is shown in FIG. 1 a helicopter 11 including collective control line 13, cyclic fore and aft control line 15, and cyclic lateral control line 17 for controlling main rotor 19, and directional control line 21 for controlling tail rotor 23. The helicopter is provided with a primary pilot's control seat 25 with primary cyclic control stick 27, primary control pedal 31, and primary collective control stick 29 located adjacent to seat 25. Collective control line 13 is connected to, and manipulated by manipulation of, collective stick 29. Fore and aft control line 15 and lateral control line 17 are connected to, and manipulated by fore-and-aft and sideways manipulation of control stick 27. Directional control line 21 is connected to, and manipulated by manipulation of pedal 31. Helicopter 11 is also provided with a secondary pilot's control seat 33 having a secondary cyclic control stick 35, a secondary collective control stick 37 and a secondary control pedal 39 located adjacent to seat 33. Primary control stick 27 is also connected to primary fore and aft control rod 41 and primary lateral control rod 43. Primary pedal 31 is also connected to primary directional control rod 47. Primary collective stick 29 is also connected to primary collective control rod 45. Secondary control stick 35 is connected to secondary fore and aft control rod 49 and secondary lateral control rod 51. Secondary collective control stick 37 is connected to secondary collective control rod 53. Secondary pedal 39 is connected to secondary directional control rod 55. Disconnect linkage 57 releasably connects control rods 41, 43, 45 and 47 to control rods 49, 51, 53 and 55, respectively, so that secondary controls 35, 37 and 39 operate in unison with primary controls 27, 29 and 31 respectively and can operate control lines 13, 15, 17 and 21, when disconnect linkage 57 is engaged.

Referring now to FIG. 2, disconnect linkage 57 includes four positive locking clutches 59, 61, 63 and 65 rotatably disposed on shaft 67 which is connected to and is extended and retracted by cylinder 69. Cylinder 69 can for example be a hydraulic cylinder. Cylinder 69 is mounted on plate 71 which is fixed to frame 73.

Figure 4:
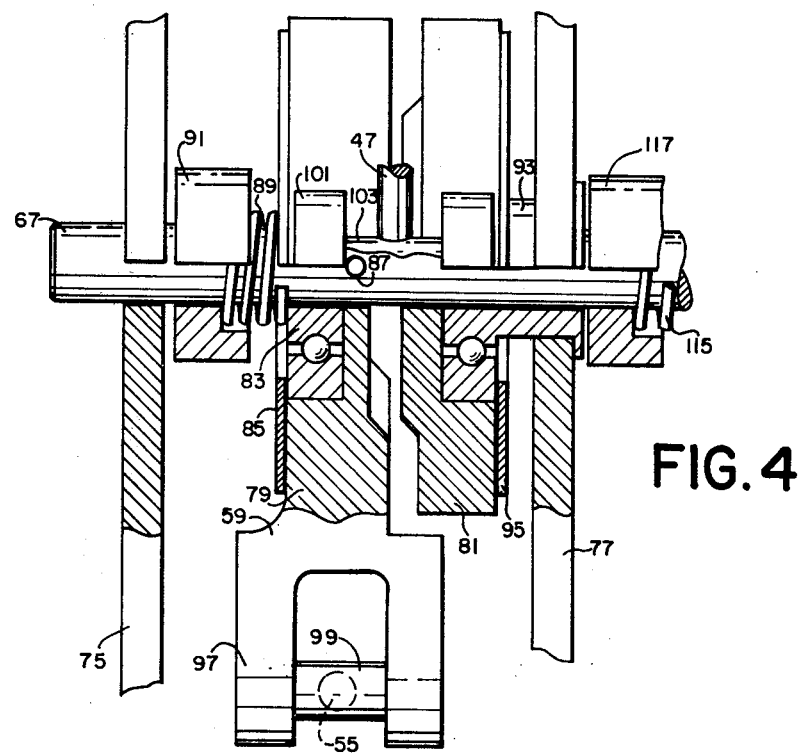
FIG. 4 shows a section of the disconnect linkage taken on the line 4—4 of FIG. 3.

Clutch 59 is shown in greater detail in FIG. 4. As shown in FIG. 4, clutch 59 is disposed between walls 75 and 77 of frame 73, and includes two clutch halves 79 and 81. Clutch half 79 is rotatably connected to shaft 67 by bearing 83, which can for example be a ball bearing, and which is slideably mounted on shaft 67. The interface between bearing 83 and shaft 67 can be a journal bearing and can be lubricated. Bearing 83 permits rotation of clutch half 79 about shaft 67. Bearing 83 is held in place in clutch half 79 by plate 85, which can be fixed to clutch half 79 by screws, adhesive, bolts, rivets or any other conventional means. Lateral motion of clutch half 79 on shaft 67 is restricted by pin 87 which is fixed to and extends from shaft 67, and by spring 89 disposed between and abutting bearing 83 and collar 91. Pin 87 can for example be a spring pin. Collar 91 is fixedly mounted on shaft 67 by adhesive, a bolt, a pin or by any other conventional means. Bearing 93, which can be a roller bearing, permits only rotational motion, not lateral motion, of clutch half 81 with respect to wall 77. Bearing 93 can be held in place in clutch half 81 by plate 95 or by any other conventional means. Plate 95 can be fixed to clutch half 81 by screws, adhesive, bolts, rivets or by any other conventional means. Bearing 93 is slideably disposed on shaft 67, and the interface between bearing 93 and shaft 67 can be a journal bearing and can be lubricated. Bearing 93 is fixedly mounted on wall 77 and can be held in place by screws, bolts, rivets, adhesive or any other conventional means, so that clutch half 81 is not displaced relative to wall 77 by extension or retraction of shaft 67 by cylinder 69. Shaft 67 is slideably and supportably mounted in walls 75 and 77. This mounting or connection can be in the form of a journal bearing or any other type of conventional bearing or bushing. Clutch half 79 is provided at one end with a yoke 97 which rotatably engages a bar 99 to which secondary directional control rod 55 is attached. Clutch half 81 is provided with a yoke 101 which rotatably engages a bar 103 to which primary directional control rod 47 is attached. Clutch halves 79 and 81 have corresponding recesses or male and female portions so that when clutch halves 79 and 81 are rotated 90° with respect to each other, and are pressed together, the unrecessed, male portions of clutch half 79 will seat in the recessed, female portions of clutch half 81 and the unrecessed, male portions of clutch half 81 will seat in the recessed, female portions of clutch half 79, so that clutch halves 79 and 81 positively lock and engage. Thus, when clutch halves 79 and 81 are engaged, control rods 47 and 55 are connected connected, so that movement of one rod causes corresponding movement of the other rod when clutch halves 79 and 81 are engaged. The arrangement, relative position and connection of rods 47 and 55 and clutch halves 79 and 81 is also shown in FIG. 3. A plate 105 is fixedly mounted on plate 85 to extend from clutch half 79. Mounting plate 107 is fixedly mounted on frame 73. A double pole single throw (DPST) switch 109 is mounted on and extends from mounting plate 109 and is so positioned that, when clutch halves 79 and 81 are engaged, plate 105 depresses and actuates switch 109.

As shown in FIG. 2, disconnect linkage 57 includes four individual clutch assemblies 59, 61, 63, and 65, one for each flight control, and clutches 61, 63 and 65 have similar corresponding components like those shown above in FIGS. 3 and 4 for clutch 59. Thus, clutch 61 includes clutch halves 111 and 113 which are urged together by a spring 115 abutting collar 117. Clutch 63 includes clutch halves 129 and 131 which are urged together by a spring (not shown) abutting collar 133. Clutch 65 includes clutch halves 145 and 147 which are urged together by a spring (not shown) abutting collar 149. Clutch halves 111, 113, 129, 131, 145 and 147 are all slideably and rotatably disposed on shaft 67, like clutch halves 79 and 81. Collars 117, 133 and 149 are coaxially fixed to shaft 67, like collar 91. Clutch halves 111, 129 and 145 are each provided with respective yokes 119, 135, 151, which pivotally engage respective bars 121, 137, 153 to which secondary control rods 51, 53, and 49, respectively, are attached. Clutch halves 113, 131 and 147 are rotatably connected to respective walls 127, 143, 159 and are each provided with respective yokes 123, 139, 155 which pivotally engage respective bars 125, 141, 157 to which primary control rods 43, 45 and 41, respectively, are attached. Thus, when engaged, clutch 61 links control rods 43 and 51, clutch 63 links control rods 45 and 53, and clutch 65 links control rods 41 and 49. Like clutch 59, clutches 61, 63 and 65 include respective pins, bearings, plates and switches, as shown for clutch 59 in FIGS. 3 and 4 but not visible in FIG. 2. All four DPST switches are mounted on plate 107 which is fixed to frame 73. Threaded stop 161, which threadingly engages threads 163 of shaft 67, and is further retained by threaded jam nut 162 which also threadingly engages threads 163 of shaft 67, determines the maximum separation between respective clutch halves 79, 111, 129, 145 and 81, 113, 147 while disengaged by limiting the extent to which cylinder 69 can extend shaft 67. The linkage of FIG. 2 is shown with shaft 67 in an extended position, with all clutches 59, 61, 63 and 65 disengaged. When shaft 67 is fully extended by cylinder 69, stop 161 is forced against wall 159, thus limiting the movement of shaft 67 during extension. Springs 89, 115 and the springs (not shown) disposed between respective collars or housings 133, 149, and clutch halves 129, 145 urge respective clutch halves 79, 111, 129, 145, and 81, 113, 131, 147 together, but are limited by pin 87 fixed to and extending from shaft 67, and by the three similar pins (not shown) for clutches 61, 63 and 65. Spring 165, which can be a compression spring, is disposed about shaft 67 between and urging apart washer 167 and stop 169. Washer 167 is slideably disposed on shaft 67, and is urged by spring 165 to abut cylinder 69. Stop 169 threadingly engages threads 173 of shaft 67, and is further held in place by jam nut 171 which also threadingly engages threads 173 of shaft 167. Spring 165 acts as a fail-safe device, which can be resisted by cylinder 69 but is capable of extending shaft 67 sufficiently for disengagement of clutches 59, 61, 63, and 65 in the event of loss of power to cylinder 69. Collar 175 is slideably disposed on shaft 67 between shaft 67 and spring 165 and between washer 167 and stop 169. Collar 175 limits the distance A which shaft 67 can travel when retracted by cylinder 69. The difference A between the length of collar 175 and the separation distance between washer 167 and stop 169 can be adjusted by adjusting the position of stop 169 and jam nut 171 on threads 173 of shaft 67. Thus, the displacement A which cylinder 69 can move respective clutch halves 79, 111, 129, 135, and 81, 113, 131, 147 together is determined by the position of stop 169 on shaft 67.

Supply 177 provides hydraulic fluid at constant pressure, for example, at a pressure of 3000 psi, and provides a return for the fluid. Supply 177 provides the fluid to one port of two way, two position, normally closed, solenoid operated hydraulic valve V2 and to pressure reducing valve 179. Pressure reducing valve 179 produces the hydraulic fluid at a pressure below the pressure at which the fluid is supplied to the valve, such as 275 psi. Hydraulic fluid at this reduced pressure is supplied to one port of two way, two position, normally closed, solenoid operated hydraulic valve V1 and to the normally open port of three way, two position, solenoid operated hydraulic valve V4. The other port of valve V1 and of valve V2 are connected to the retract port of cylinder 69. The exhaust port of valve V4 is connected to the extend port of cylinder 69. The retract and extend ports of cylinder 69 are connected to the return of supply 177 by two way, two position, normally open, solenoid operated hydraulic valve V3 and via the normally closed port of valve V4, respectively. Check valves 181, 183, 185 and 187 permit fluid flow only in the proper directions. Thus, normally, low pressure is applied to the extend port of cylinder 69, while the retract port is connected to the return of supply 177.

As shown in FIG. 5, each plate 105, 193, 197, 201 is fixed to a respective clutch half 79, 111, 129, 145 to depress a respective DPST switch 109, 195, 199, 203 when respective clutch 59, 61, 63, 65 is engaged. Electric power, which can be +28 volts direct current, is supplied to the electric circuit shown in FIG. 5, through on-off single pole single throw (SPST) switch 189, which can for example be a toggle switch. Lights P1, P2, P3, P4 and P5 are so located in helicopter 11 near primary pilot's seat 25 as to be readily visible to the primary pilot of the helicopter. Lights S1, S2, S3, S4 and S5 are so positioned in helicopter 11 near secondary pilot's seat 33 as to be readily visible to the secondary pilot of the helicopter. The solenoids operating valves V1, V3 and V4 are each connected between switch 189 and ground, so that these three valves are actuated when switch 189 is closed. Half of each of switches 109, 195, 199 and 203 are connected together in series with and between switch 189 and the solenoid of valve V2, so that valve V2 is not actuated until all clutches 59, 61, 63 and 65 are engaged. Lights P1 and S1 and relay 191 are similarly connected and actuated. The other half of switches 109, 195, 199 and 203 are connected to switch 189 in parallel, so that respective lights P2, P3, P4, P5 and S2, S3, S4, S5 are lighted when respective clutch 59, 61, 63, 65 is engaged.

Cyclic control stick 27 controls forward, aft and lateral movement of helicopter 11 through fore-and-aft control line 15 and lateral control line 17 to main rotor 19. Moving cyclic control stick 27 in any direction is transmitted via lines 15 and 17 to tilt the tip-path plane of main rotor 19 to move helicopter 11 in the same direction. Collective control stick 29 controls vertical movement of helicopter 11 through collective control line 13 to main rotor 19. Movement of collective control stick 29 is transmitted via line 13 to change the collective pitch of the blades of main rotor 19. In other words, movement of stick 29 causes the pitch angle of the blades of main rotor 19 to change simultaneously regardless of their relative position of the blades in the path of rotation. Control pedal 31 controls helicopter 11 heading through directional control line 21 to rear rotor 23. Movement of control pedal 31 is transmitted via line 21 to change the pitch and and resulting thrust of the blades of rear rotor 23. When disconnect linkage 57 is engaged, secondary controls 35, 37 and 39 similarly control helicopter 11 like respective primary controls 27, 29 and 31.

The operation of disconnect linkage 57 is as follows. Switch 189 is so positioned in helicopter 11 near primary control pilot's seat 25 as to be readily operated by the primary pilot of the helicopter. While switch 189 is open, so that electric current does not pass therethrough, low pressure is directed to the extend port of cylinder 69 to maintain disengagement of clutches 59, 61, 63 and 65. For engagement of clutches 59, 61, 63 and 65, switch 189 is first closed by the primary pilot, so that electric current passes through the switch and valves V1, V3 and V4 are actuated. When valves V1, V3 and V4 are in the actuated position, relatively low hydraulic pressure, such as 275 psi, is directed through valve V1 to the retract port of cylinder 69, and the extend port of cylinder 69 is connected through valve V4 to the return of supply 177. As a result of the applied pressure cylinder 69 causes retraction of shaft 67. Collars 91, 117, 133 and 149, pin 87, and the corresponding pins for clutches 61, 63 and 65 all of which are fixed to shaft 67, move with shaft 67 toward cylinder 69 so that respective springs 89, 115 and the corresponding springs for clutches 63 and 65 are compressed. Due to this compression and to the retraction of pin 87 and the corresponding pins for clutches 61, 63 and 65, clutch halves 79, 111, 129 and 145 move with shaft 67 towards their respective mating clutch halves 81, 113, 141 and 147. Each clutch half 79, 111, 129, 145 moves only a small distance, which can be 1/16 inch, before contacting its respective mating clutch half 81, 113, 131, 147. However, clutch engagement shaft 67 moves an additional distance, which can be ⅛ inch, and applies increased engagement force through springs 89 and 115 and the corresponding springs for clutches 63 and 65. Relative movement of each secondary flight control 35, 37, 39 with respect to primary flight controls 27, 29, 31 will cause respective clutch half 79, 111, 129 145 to rotate with respect to respective clutch half 81, 113, 131, 147 to align perpendicularly thereto for engagement. Such relative movement can be accomplished by individual manipulation of each secondary control 35, 37, 39 by the secondary pilot. As clutch halves 79, 111, 129 and 145 individually rotate and are properly aligned with respect to respective clutch halves 81, 114, 131, and 147 for engagement, clutch halves 79, 111, 129 and 145 each mesh with its respective mating clutch half 81, 113, 131 and 147 by moving an additional distance, which can be ⅛ inch, thereto due to the force exerted thereon by respective springs 89, 115 and the springs for clutches 63 and 65. As each clutch 59, 61, 63 and 65 meshes, its respective switch 109, 195, 199 or 203 is depressed by movement of respective plate 105, 193, 197, 201 together with the respective clutch half 79, 111, 129, 145 to which the plate is fixed. One half of each DPST switch 109, 195, 199 and 203 lights respective lights P2 and S2, P3 and S3, P4 and S4, or P5 and S5 as the corresponding clutch 59, 61, 63 or 65 is engaged. The other halves of switches 199, 195, 199 and 203 are wired in series so as to complete the circuit to actuate V2 when all four clutches 59, 61, 63 and 65 are engaged. When valve V2 is actuated, relatively high hydraulic pressure, such as 3000 psi, is directed through valve V2 to the retract port of cylinder 69 to maintain engagement of clutches 59, 61, 63 and 65, and simultaneously indicator lights P1 and S1 are illuminated indicating that all four clutches 59, 61, 63 and 65 are meshed and that primary flight controls 27, 29 and 31 and secondary flight controls 35, 37 and 39 are completely interconnected. The increased pressure causes cylinder 69 to further retract shaft 67 for firm engagement of clutches 59, 61, 63 and 65. This further movement is limited by collar 175, to prevent damage to the linkage 57 by action of cylinder 69. Since pin 87 or the pins for clutch 61, 63 or 65 is now located in the space between bearings 83 and 93 or the respective bearings for clutch 61, 63 or 65, by the movement or retraction of shaft 67, the pin neither is crushed nor resists the engagement of respective clutch halves. Relay 191 is actuated simultaneously with valve V2 to maintain electric power to valve V2 and prevent linkage 57 disengagement even if a switch 109, 195, 199 or 203 fails or is accidentally disconnected.

For disengagement of linkage 57, the primary pilot need only open switch 189, breaking the electric circuit to the solenoids of valves V1, V2, V3 and V4, to relay 191, and to lights P1, P2, P3, P4, P5, S1, S2, S3, S4 and S5. Lights P1, P2, P3, P4, P5, S1, S2, S3, S4 and S5 then go out, and relay 191 and valves V1, V2, V3 and V4 return to their respective normal, unactuated conditions. As a result, pressure is removed from the retract port of cylinder 69, the retract port of cylinder 69 is connected to the return of supply 177, and low pressure is applied to the extend port of cylinder 69. This pressure causes cylinder 69 to extend shaft 67. Collars 91, 117, 133 and 149, pin 87 and the corresponding pins for clutches 61, 63 and 65 move with shaft 67 away from cylinder 69. This movement of collars 91, 117, 133 and 149 relieves the engagement force on respective clutches 59, 61, 63 and 65, and pin 87 and the corresponding pins for clutches 61, 63 and 65 positively move respective clutch halves 79, 111, 129, 145 and 81, 113, 131, 147 apart, rapidly effecting and maintaining disengagement of clutches 59, 61, 63 and 65 and thus of linkage 57.

It should be understood that the present invention can be used for disconnectably linking any control or force transmission system. Also, any number of such systems could be so linked thereby, and the present invention can be provided with any number of clutches. In addition, any motor means can be used in lieu of hydraulic cylinder 69 to longitudinally displace shaft 67. Also, by transposing the clutch halves on the shaft and frame, and connecting the fail-safe spring 165 between wall 77 and stop 169 to urge retraction of shaft 67, engagement of the clutches can occur when the shaft is extended instead of when the shaft is retracted as desired. For cylinder 69, any combination of higher and lower pressures other than 3000 psi and 275 psi can be used. Furthermore, the voltage supplied to switch 189 need not be +28 VDC.

Obviously, many modifications and variations of the present invention are possible in light of the above teachings. It is therefore to be understood that within the scope of the appended claims the invention may be practiced otherwise than as specifically described.

What is claimed is:

1. A disconnect linkage for a force transmission system, comprising:
    a support;
    a shaft slideably journaled in said support;
    a plurality of pairs of mating members coaxially and rotatably disposed on said shaft for selective engagement with longitudinal movement of said shaft, respective members of said mating pairs being rotatably connected at spaced intervals to said support and slideably disposed on said shaft, and the other members of said pairs being operatively connected at correspondingly spaced intervals to said shaft for longitudinal movement therewith, each of said pairs of mating members being adapted to be interposed in the force transmission system for disconnectable linking thereof; and
    motor means connected to said shaft for selective longitudinal movement thereof.

2. A linkage as recited in claim 1, further comprising:
    resilient means interposed between said support and said shaft for urging said clutches out of engagement.

3. A linkage as recited in claim 1, further comprising first limiting means connected to said shaft and configured to engage said support for limiting separation of each of said members of each of said pairs.

4. A linkage as recited in claim 1, further comprising second limiting means connected to said shaft and configured to engage said support for limiting longitudinal movement of said shaft for engagement of each of said pairs of mating members.

5. A linkage as recited in claim 1, further comprising:
    alarm means connected to each of said clutches for indicating whether each of said clutches, and all of said clutches, are engaged or disengaged.

6. A linkage as recited in claim 5 wherein said alarm means comprises:
    a plurality of indicators;
    a plurality of switches connected to said indicators for actuation thereof;
    a plurality of actuation means, one connected to each clutch, for actuation of a switch when the clutch to which said actuation means is connected is engaged.

7. A linkage as recited in claim 1, further comprising:
    first control means, connected to said motor means, for controlling the extent of longitudinal displacement of said shaft by said motor means.

8. A linkage as recited in claim 7 wherein said first control means comprises first and second signal means for causing said motor means to apply respective first and second force levels to said shaft for engagement of said pairs of said mating members.

9. A disconnect linkage for a force transmission system, comprising:
    a support;
    a shaft slideably journaled in said support;
    a plurality of clutches coaxially disposed on said shaft for selective engagement with longitudinal movement of said shaft, each of said clutches being adapted to be interposed in a force transmission system for disconnectable linking thereof;

motor means connected to said shaft for selective longitudinal movement thereof;

first control means, connected to said motor means, for cntrolling the extent of longitudinal displacement of said shaft by said motor means;

switching means responsive to an engagement command for indicating whether said clutches are to be engaged or disengaged; and second control means, connected to said first control means, to said switching means and to each of said clutches and responsive to whether said clutches are engaged, for controlling said first control means.

10. A linkage as recited in claim 9, further comprising:

third control means operatively connected to said first control means, to said second control means and to said switching means for controlling said first control means to maintain displacement of said shaft by said motor means for engagement of all of said clutches from such indication by said switching means and engagement of all of said clutches until indication by said switching means that said clutches are to be disengaged.

11. A disconnect linkage for a force transmission system, comprising:

a support;

a shaft slideably journaled in said support;

a plurality of clutches coaxially disposed on said shaft for selective engagement with longitudinal movement of said shaft, each of said clutches being adapted to be interposed in a force transmission system for disconnectable linking thereof, and each of said clutches comprising a pair of mating members each being formed to connect to the force transmission system and being slideably disposed on said shaft; and motor means connected to said shaft for selective longitudinal movement thereof.

12. A linkage as recited in claim 11, further comprising:

a like plurality of detents fixed to and extending from said shaft, each of said detents being disposed between one of said pairs of mating members for urging said mating members apart; and a like plurality of elastic means, each interposed between said shaft and one of said clutches, for urging said mating members together.

13. A force transmission system, comprising:

a plurality of force producing means;

a like plurality of force receiving means;

a support;

a shaft slideably journaled in said support;

a plurality of pairs of mating members coaxially and rotatably disposed on said shaft for selective engagement with longitudinal movement of said shaft, respective members of said mating pairs being rotatably connected at spaced intervals to said support and slideably disposed on said shaft, and the other members of said pairs being operatively connected at correspondingly spaced intervals to said shaft for longitudinal movement therewith, each of said pairs of mating members being connected to and disconnectably linking a force producing means to a corresponding force receiving means; and motor means connected to said shaft for selective longitudinal movement thereof.

* * * * *